April 21, 1925.  
O. J. DORSEY  
WEAR COMPENSATING DEVICE  
Filed Oct. 18, 1921   2 Sheets-Sheet 1

1,534,170

Witnesses:
Lynn Brodton
Augustus B. Coppes

Inventor
Otho J. Dorsey
By Joshua R. H. Potts
Attorney

April 21, 1925.  1,534,170
O. J. DORSEY
WEAR COMPENSATING DEVICE
Filed Oct. 18, 1921  2 Sheets-Sheet 2
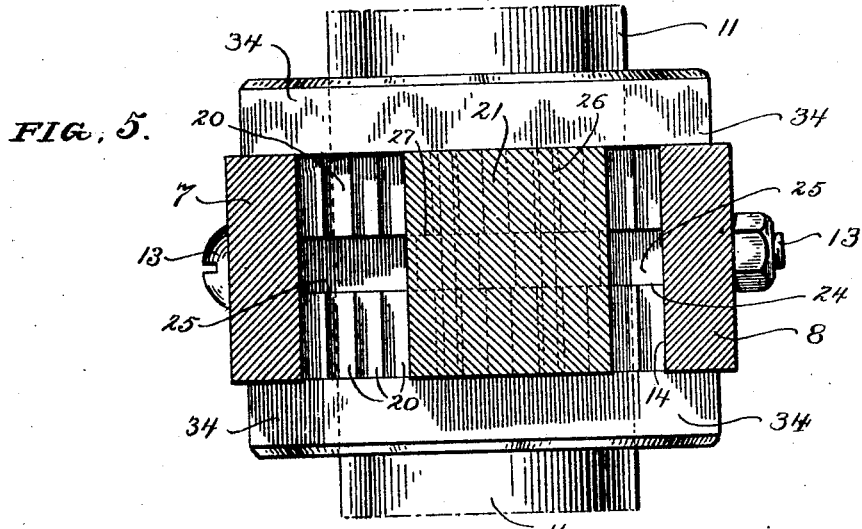
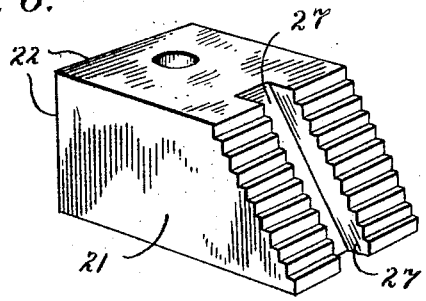
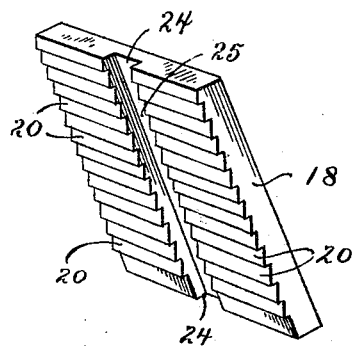
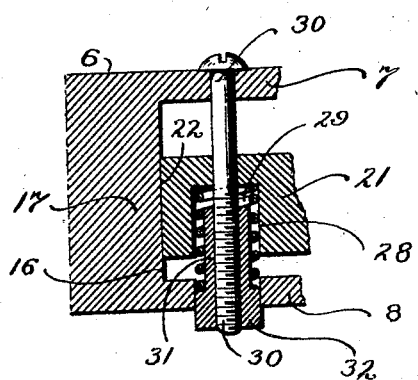
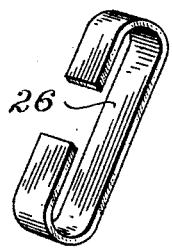
Witnesses:
Lynn Brodton
Augustus B. Coppes
Inventor
Otho J. Dorsey
By Joshua R. H. Potts
Attorney Patented Apr. 21, 1925.

1,534,170

UNITED STATES PATENT OFFICE.

OTHO J. DORSEY, OF PHILADELPHIA, PENNSYLVANIA.

WEAR-COMPENSATING DEVICE.

Application filed October 18, 1921. Serial No. 508,594.

*To all whom it may concern:*

Be it known that I, OTHO J. DORSEY, a citizen of the United States, residing at Philadelphia, in the county of Philadelphia and State of Pennsylvania, have invented certain new and useful Improvements in Wear-Compensating Devices, of which the following is a specification.

It is well known that the bearings for crank pins on connecting rods of engines soon wear owing to the powerful action of the connecting rods and that this wear soon causes a looseness of the connection which if not immediately attended to causes pounding and injury to the parts.

One object of my invention is to provide improved means which will automatically compensate for wear between the bearing of a connecting rod or pitman and the crank pin or shaft to which it is attached.

Another object is to make the device of my invention of a practical, simple and durable construction.

These objects, and other advantageous ends which will be described hereinafter, I attain in the following manner, reference being had to the accompanying drawings in which—

Figure 1:
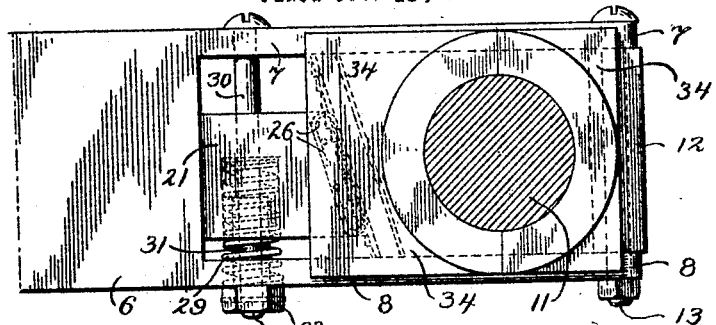
Figure 3:
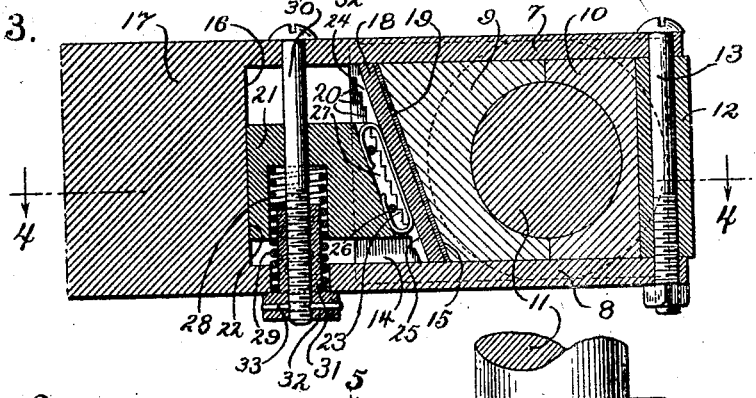
Figure 2:
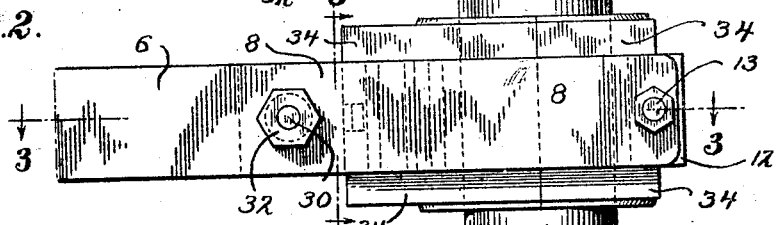
Figure 4:
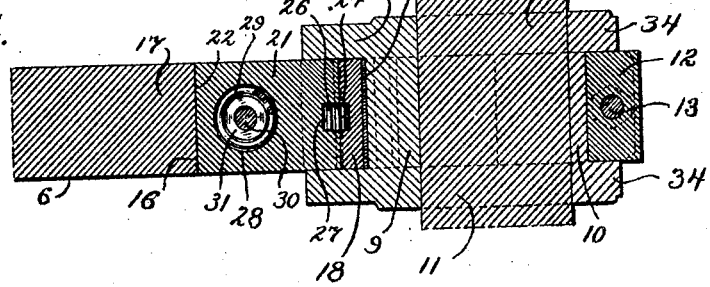

Figure 1 is a side elevation of a structure made in accordance with my invention, Figure 2 is an inverted plan view of Figure 1, Figure 3 is a section taken on the line 3—3 of Figure 2, Figure 4 is a section taken on the line 4—4 of Figure 3, Figure 5 is an enlarged section taken on the line 5—5 of Figure 2, Figure 6 is a perspective view of the wedge block, Figure 7 is a perspective view of the rack plate, Figure 8 is a perspective view of the spring shoe, and Figure 9 is a fragmentary section showing a slight modification of certain of the parts.

Referring to the drawings, 6 represents a connecting rod or pitman which is bifurcated at its end; the furcations 7 and 8 being spaced apart to provide room for bearing blocks 9 and 10; said bearing blocks having concavities providing a bearing for a crank pin or shaft 11. This crank pin or shaft may be on any movable element, such for example as on a crank arm.

A filler block 12 is positioned between the furcations 7 and 8 and forms an abutment for the bearing block 10. A bolt 13 or other suitable securing device extends through the furcations and filler block and serves to hold the parts together.

The bearing block 9 at its end opposed to the block 10 includes a cavity 14, the inner surface 15 of which slants upward with respect to the inner vertical surface 16 of the body portion 17 of the connecting rod. A toothed rack plate 18 is mounted within the cavity 14 and between this plate 18 and the surface 15 is preferably positioned a liner plate 19 for a purpose hereinafter described. The teeth of the rack plate 18 includes surfaces 20 which are approximately parallel with the surface 16; the line of the teeth taking the slant of the surface 15. A wedge block 21 has a surface 22 coincident with the surface 16 of the connecting rod. The portion of the wedge block 21 opposed to the surface 22 is provided with teeth 23 adapted to mesh with the teeth of the rack plate 18. It will be noted that there are less teeth on the wedge block than on the rack plate 18 and under certain conditions hereinafter described the wedge block can be moved so as to cause its teeth to engage other teeth of the rack plate from those which it engages as shown in Figure 3.

The rack plate 18 has a groove 24 which cuts through the teeth of the rack plate within their width so as to provide a smooth surface 25 for engagement by a looped spring shoe 26 which is secured within a recess 27 in the wedge block 21; said recess 27 being cut through the teeth 23 within their width. The ends of the looped spring shoe are secured within the recess 27 and the spring shoe tends to move the bearing block 9 toward the crank pin or shaft 11.

The wedge block 21 has a bore 28 extending partway therethrough; said bore leading upward from the lower surface of the wedge block. A coiled spring 29 has a portion fitting within the bore 28. A securing member 30 illustrated in the form of a bolt extends through the furcations 7 and 8 and through the wedge or block 21 at a position so as to pass through the bore 28. A follower bushing 31 is screwed on the bolt 30 and has a portion 32 adapted to engage the lower surface of the connecting rod. The spring 29 surrounds the bushing and engages the portion 32 thereof. If desired a pin 33 can extend through the bushing and bolt to lock the bushing thereto and it will be noted that the spring 29 tends to move the wedge block 21 upward. The bearing blocks 9 and 10 have side flanges 34 which embrace the side surfaces of the furcations 7 and 8 and tend to prevent lateral movement of the bearing blocks within the space between the furcations.

The action of the device is as follows: When any slight wear occurs between the crank pin or shaft 11 and the block 9, the spring shoe tends to convey the block 9 against the crank pin. When wear occurs to the extent of the depth of the teeth, then the spring 29 will act to move the wedge block 21 upward and cause the teeth thereon to engage other teeth on the rack plate which are nearer the surface 16. In this manner, the wear is compensated for until the wedge block has reached its extreme upward limit. Then, if it is not desired to replace the block 9 with a new one, the liner 19 can be removed and a thicker liner inserted between the rack plate and the surface 15 of the bearing block 9. By providing the groove 24 in the rack plate the spring shoe will have a smooth guideway in which to operate. Furthermore the cavity 14 serves as a guideway for a portion of the wedge block and the bolt 30 and surface 16 serves as additional means to prevent lateral movement of the wedge block.

In the form of my invention shown in Figure 9 the construction is substantially similar to that described with exception that the follower sleeve can be moved upward through the hole in the lower furcation so as to compress the spring 29 to various extents; thus making the spring stronger or weaker in its action upon the wedge block.

If it is necessary to change the bearing block 10 the same can be done by removing the filler block 12 and inserting a new block 10.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A device of the character described including a shaft bearing having a movable section with an inclined face; a block having an inclined face having teeth thereon and a groove intersecting the teeth; a plate, having teeth and a groove intersecting the teeth, disposed between the inclined face of the movable bearing section and the inclined face of the block; a spring disposed in the groove and adapted to press the plate away from the block, and automatic means for moving the block to cause its teeth to engage successively with the teeth on the plate, substantially as described.

2. A device of the character described including a connecting rod providing a bearing for a shaft, said bearing including a movable section; a wedge block having teeth thereon; means providing teeth between the teeth of said block and said member; and means for automatically moving said block to cause its teeth to engage others of said second mentioned teeth when wear occurs at said bearing, the teeth of said block and the other teeth being arranged in rows extending at a slant to the length of said connecting rod, said teeth having abutting surfaces approximately at right angles to the length of said connecting rod; substantially as described.

3. A device of the character described including a connecting rod providing a bearing for a shaft, said bearing including a movable section; a wedge block having teeth thereon; means providing teeth between the teeth of said block and said member; means for automatically moving said block to cause its teeth to engage others of said second mentioned teeth when wear occurs at said bearing, the teeth of said block and the other teeth being arranged in rows extending at a slant to the length of said connecting rod; and a spring interposed between the wedge block and said bearing member for exerting a pressure upon said bearing member in the direction of the length of said connecting rod; substantially as described.

4. A device of the character described including a connecting rod having a bifurcated end with the furcations spaced apart; a bearing positioned between said furcations and including a movable part; a wedge block between said movable part and the inner surface of the bifurcated end, said bearing block having a cavity; a spring having a portion within said cavity; and means connected to said connecting rod for holding said spring at a position to permit said spring to move said wedge block to take up for any wear occurring at the bearing; substantially as described.

5. A device of the character described including a connecting rod having a bifurcated end with the furcations spaced apart; a bearing positioned between said furcations and including a movable part; a wedge block between said movable part and the inner surface of the bifurcated end, said bearing block having a cavity; a spring having a portion within said cavity; and means connected to said connecting rod for holding said spring at a position to permit said spring to move said wedge block to take up for any wear occurring at the bearing, said connecting means including a bolt and a bushing in screw threaded connection with said bolt; substantially as described.

6. A bearing comprising a U-shaped frame, a bearing block movable in the frame and having a longitudinally inclined shoulder having serrations thereon, a longitudinally movable wedge having a tapered surface extending parallel to the inclined surface on the lower bearing also provided with serrations engaging the first mentioned serrations, resilient means urging the wedge longitudinally, and resilient means urging the bearing block vertically.

In testimony whereof I have signed my name to this specification in the presence of two subscribing witnesses.

OTHO J. DORSEY.

Witnesses:
ELIZABETH GARBE,
CHAS. E. POTTS.